June 4, 1963　　　　　　　　M. SOLTIS　　　　　　　3,091,828
CLAMP
Filed Aug. 11, 1961

INVENTOR.
Mary Soltis
BY
Arthur F. Fattibene
ATTORNEY

United States Patent Office 3,091,828
Patented June 4, 1963

3,091,828
CLAMP
Mary Soltis, 362 Soundview Ave., Stratford, Conn.
Filed Aug. 11, 1961, Ser. No. 130,992
1 Claim. (Cl. 24—87)

This invention relates in general to clamps, and more specifically to a flesh clamp particularly adapted for use in closing the incision in the carcass of a stuffed fowl and the like during cooking of the same.

Heretofore, it had been customary in cooking a stuffed fowl and the like to close the incision in the carcass of the fowl by either sewing or lacing the incision to draw the parted flesh together. Such sewing or lacing of the flesh together to close the incision is a tedious, time-consuming and messy operation. The disadvantages of sewing or lacing the incision of a stuffed fowl becomes even more apparent in institutional cooking, i.e. cooking for hospitals, restaurants, schools, cafeterias, camps, banquet catering services and such which require the preparation of a relatively large number of stuffed fowls. In cooking stuffed fowl for such institutions much time, labor and manpower is lost simply by the task of closing the incision of the many fowls. This adds substantially to the expense or cost per serving. In addition, in home cooking many housewives find the task of sewing or lacing the posterior end of a stuffed fowl a disagreeable task.

Therefore an object of this invention is to provide a quick and easy means for positively closing the incision in the carcass of a stuffed fowl or the like in preparation for cooking the same.

Another object is to provide a novel positive-acting clamping device for drawing the parted flesh of a stuffed fowl together for closing the incision, and for maintaining the incision closed during cooking.

A feature of this invention resides in the provision that the clamping device is relatively simple in construction, easily fabricated, relatively inexpensive, and positive in operation.

Other features and advantages will be rendered readily apparent when considered in view of the drawings and description in which.

Figure 1:
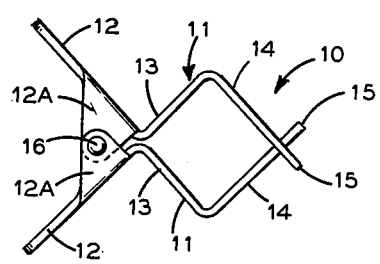
FIG. 1 is a side view of the novel clamping device in accordance with this invention.

Referring to the drawings, FIGS. 1 to 4 illustrate the clamping device 10 of the instant invention. It comprises essentially a pair of cooperating members 11. Each member 11 is preferably formed of blank which can be readily stamped from a stock of suitable metallic sheet material, such as aluminum, stainless steel or the like. The blank from which member 11 is formed is bent about a pair of transversely spaced folds to define a substantially Z-shaped member 11. Thus each member 11 comprises a finger press portion 12, a jaw portion 14, and a connecting intermediate portion 13.

According to this invention the finger press portion 12 of each member 11 is provided with a pair of opposed tabs 12A bent at substantially right angles to the finger press portion 12. Each tab 12A is provided in aligned apertures for receiving a hinge pin 16. As shown, the members 11 are oppositely disposed so that the opposed tabs 12A of one member 11 overlie the opposed tabs 12A of the complementary member 11. In the arrangement illustrated the finger press portions 12 of members 11 diverge outwardly and the jaw portions 14 converge inwardly.

Figure 2:
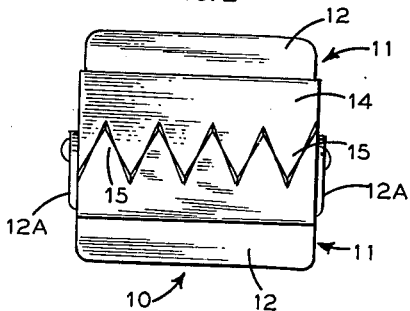
FIG. 2 is a front elevation view of FIG. 1.
Figure 3:
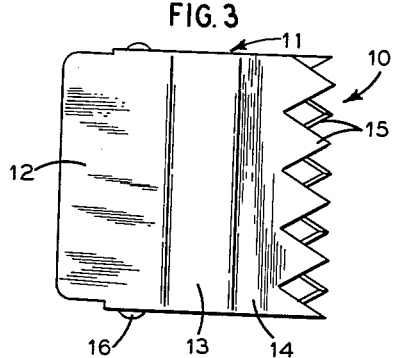
FIG. 3 is a plan view of FIG. 1.

Referring to FIGS. 2 and 3, each jaw portion is provided with a plurality of sharp teeth 15. Accordingly the teeth 15 of one jaw 14 are staggered with respect to the teeth of the other jaw. Thus in the normal gripping position, the jaws are angled so that as the teeth 15 of the respective jaws 14 close and interlock, the parted flesh defining the incision in the carcass of the fowl is drawn together, as shown in FIG. 5.

Figure 4:
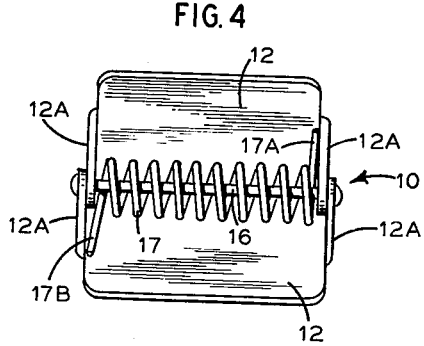
FIG. 4 is a rear view of FIG. 2.

According to this invention a spring means 17 is provided to normally urge and maintain the jaws 14 in gripping position. As best seen in FIGS. 4 and 5 the spring means comprise a coil spring 17 having spaced convolutions which are disposed longitudinally about the hinge pin 16. According to this invention the end convolutions of spring 17 terminate in oppositely disposed tail end portions 17A and 17B which transmit the load of the spring 17 to the opposed finger press portions 12. Thus the force of the spring 17 normally biasing the finger press portions apart, serves to maintain the jaw portions 14 in normal gripping position. To open the clamp 10 the cook needs only to press portions 12 together to open jaws 14. It is to be noted that the angle of jaw portions 14 is such that when the jaws 14 are parted, the teeth 15 of each jaw 14 are directed substantially normal to the flesh of the carcass. Thus, in operation the cook needs only to draw the parted flesh within the spread of the open jaw portions. Then with the jaws opened simply press the clamp 10 into the flesh with the jaws 14 straddling the incision. Because the teeth 15 are normal to the flesh in the open position of the jaws, no difficulty is encountered in puncturing the flesh on opposite sides of the incision. Upon release of the finger press portions 12 the spring 17 will bias the jaws 14 to closed position and thereby draw the flesh together to close the incision.

Figure 5:
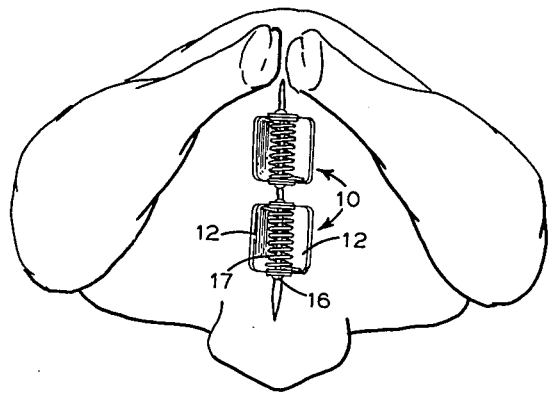
FIG. 5 illustrates the application of the clamp of FIGS. 1 to 4 as applied to the carcass of a stuffed fowl in preparation for cooking the same.

As shown in FIG. 5, a plurality of clamps 10, as may be necessary, may be spaced longitudinally of the incision to close a given incision.

With the clamps described it will be rendered readily apparent that the incision in a stuffed fowl can be quickly and easily closed with greater ease and facility, than the heretofore sewing or lacing of the incision. Thus for institutional cooking where large numbers of stuffed fowl are required to be cooked, the clamp of the instant invention results in a substantial reduction in the time, effort and manhours formerly required to accomplish the task of closing the incision. Thus a substantial economic saving is afforded by the use of the invention in institutional cooking of stuffed fowl.

In addition, for home preparation of stuffed fowl and the like, the individual housewife with the use of the instant clamp, can eliminate a heretofore disagreeable and messy task of sewing or lacing up the posterior end of a stuffed fowl.

While the instant invention has been disclosed with reference to a particular embodiment thereof, it is to be appreciated that the invention is not to be taken as limited to all of the details thereof as modifications and variations thereof may be made without departing from the spirit or scope of the invention.

What is claimed is:

A flesh clamp for closing an incision in the carcas of a fowl or the like in preparation for cooking the same comprising a pair of similar hinged members, each of said members being formed of a metal blank bent along a pair of spaced transversely extending fold lines to define a Z-shaped member having a finger press portion, a jaw portion and a connecting intermediate portion, said finger press portion and jaw portion of the respective hinged members being oppositely bent at substantially right angles with respect to its connecting intermediate portion, said finger press portion of each blank provided with opposed integrally formed tabs bent at substantially right angles to the finger press portions of said blanks, aligned apertures formed in each pair of said opposed tabs, said members being disposed so that the tabs of one member overlie the tabs of said other member so that their respective apertures are disposed in alignment, a hinge pin extended through said aligned apertures, a spring means disposed between the finger press portions for normally urging said jaw portions to gripping position, said spring comprising a coil spring of spaced convolutions disposed about said hinge pin, and the end convolution of said spring terminating in opposed tail segments which maintains a bias on the respective finger press portions and which bias urges the respective jaw portions of said pair of members to a closed position, the respective jaw portions of each member being formed at its free end with a plurality of sharp teeth extending in the plane of the jaw portion, and the teeth of one jaw portion being staggered with respect to the teeth of the other jaw portion, and, said teeth are disposed relative to said finger press portions so that in the open position of the clamp the teeth are adapted to be normal to the parted flesh defining the incision to be closed so as to facilitate puncturing of the flesh.

References Cited in the file of this patent

UNITED STATES PATENTS

| | | |
|---|---|---|
| 289,252 | Halliday | Nov. 27, 1883 |
| 1,419,165 | Moren | Jan. 13, 1922 |
| 1,724,090 | Huntley | Aug. 13, 1929 |
| 1,900,613 | Parker | Mar. 7, 1933 |
| 2,553,070 | Van Megroot | May 15, 1951 |
| 2,867,882 | Moore | Jan. 13, 1959 |
| 2,996,776 | Cassell | Aug. 22, 1961 |